United States Patent [19]

Stemmle

[11] Patent Number: 5,267,056
[45] Date of Patent: Nov. 30, 1993

[54] RIGHT READING IMAGE FOR READ/WRITE COMPONENTS CO-MOUNTED ON A SINGLE X-Y CARRIAGE

[75] Inventor: Denis J. Stemmle, Webster, N.Y.

[73] Assignee: Xerox Corporation, Stamford, Conn.

[21] Appl. No.: 635,839

[22] Filed: Jan. 3, 1991

[51] Int. Cl.⁵ .............................................. H04N 1/10
[52] U.S. Cl. ...................................... 358/472; 358/474
[58] Field of Search ............... 358/474, 476, 472, 483, 358/296

[56] References Cited

U.S. PATENT DOCUMENTS

| | | |
|---|---|---|
| 4,075,664 | 2/1978 | Aoki et al. |
| 4,424,524 | 1/1984 | Daniele ............... 358/472 |
| 4,496,984 | 1/1985 | Stoffel ............... 358/476 |
| 4,583,126 | 4/1986 | Stoffel ............... 358/401 |
| 4,636,871 | 1/1987 | Oi ..................... 358/474 |
| 4,839,741 | 6/1989 | Wilson ............... 358/474 |
| 4,905,090 | 2/1990 | Miyake . |
| 4,920,421 | 4/1990 | Stemmle ............. 358/472 |
| 5,047,870 | 9/1991 | Filo . |
| 5,070,410 | 12/1991 | Hadley . |

FOREIGN PATENT DOCUMENTS

56-129476 10/1981 Japan .
59-230359 12/1984 Japan .

Primary Examiner—Stephen Brinich
Attorney, Agent, or Firm—Finnegan, Henderson, Farabow, Garrett & Dunner

[57] ABSTRACT

A digital copying apparatus produces a right reading image with an image reading unit co-mounted on a carriage with an image printing unit. After a width of a document is scanned, either bidirectionally or unidirectionally, and digitized, it is stored in a band memory buffer before it is printed on the next successive sweep. The digitized data stored in the band memory buffer may be processed while it is stored, prior to being printed.

32 Claims, 4 Drawing Sheets

RIGHT READING IMAGE FOR READ/WRITE COMPONENTS CO-MOUNTED ON A SINGLE X-Y CARRIAGE

BACKGROUND OF THE INVENTION

1. Field of the Invention

The present invention relates to a method and apparatus for achieving a right reading image on a copy paper with a scanning carriage where a memory is used to store the digitized information after every successive sweep.

2. Description of the Related Art

Historically, copies of document originals have been produced by a xerographic process wherein the document original to be copied is placed on a transparent platen, either by hand or automatically through the use of a document handler, and the document original is illuminated by a relatively high intensity light. Image rays reflected from the illuminated document original are focused by a suitable optical system into a previously charged photoconductor. The image light rays function to discharge the photoconductor in accordance with the image content of the original to produce a latent electrostatic image of, the original on the photoconductor. The latent electrostatic image produced is then developed by a suitable developer material commonly referred to as toner, and the developed image is transferred to a sheet of copy paper brought forward by a suitable feeder. The transferred image is thereafter fixed by fusing to provide a permanent copy while the photoconductor is cleaned of residual developer before recharging.

More recently, interest has arisen in electronic imaging, where, in contrast to the aforedescribed xerographic system, the image of the document original is converted into electrical signals or pixels and these signals, which may be processed, transmitted over long distances, and/or stored, are used to produce one or more copies. In such an electronic imaging system, rather than focusing the light image onto a photoreceptor for purposes of discharging a charged surface prior to xerographic development, the optical system focuses the image rays reflected from the document original onto the image reading array which serves to convert the image rays to electrical signals. These signals are used to create an image by some means such as operating a laser beam to discharge a xerographic photoreceptor, or by operating a direct marking system such as an ink jet or a thermal transfer printing system.

It is generally advantageous if the normally separate document reading and copy printing operations could be combined. Then, system operation and synchronization would be simplified and, system cost would be reduced because fewer parts would be used.

Conventional systems have addressed the above identified concerns. For example, U.S. Pat. No. 4,496,984 to Stoffel and U.S. Pat. No. 4,583,126, a division of the above-identified reference, disclose an input/output scanner for simultaneously reading a document and writing a copy. The document and copy sheet are fed in back to back relation to the read/write station. A monolithic full width reading array reads each line in two steps, to improve resolution. The writing array consists of rows of ink jet nozzles, where the number and disposition of ink jet nozzles is in direct correspondence to the sensors of the read bar.

U.S. Pat. No. 4,424,524 to Daniele discloses a full width read/write LED (light emitting device) array for scanning a document in the read mode or exposing the photoreceptor in the write mode. A SELFOC® optical fiber lens array is used for focusing the full width LED array on the document or photoreceptor.

U.S. Pat. No. 4,636,871 to Oi discloses a copy machine comprising separate reading and printing arrays and a scanning mechanism for moving the subject copy. Relative movement between the copying paper sheet and print element and between the document and read element is effected so that scanning is performed in the same pattern on both the reading and printing sides.

Difficulties with these conventional systems include the complexity and cost of separate components such as the complex optics, photoreceptor, and developer in a typical xerographic process such as the Daniele system. In other systems such as the Stoffel system, it is necessary for an operator to manually combine a document and copy sheet into a single unit for manual insertion to the machine feed rolls. Such a system also has a significant cost penalty associated with components such as the monolithic full width reading array.

U.S. Pat. No. 4,920,421 issued to Stemmle, and assigned to the assignee of the present application discloses a simultaneous read/write scanner/printer system in which a read head and print head are both substantially smaller and less expensive than a full width array component, and are co-mounted on the same single scanning carriage to substantially simultaneously read a document and print a copy on a copy sheet.

In Stemmle, the reading and printing operations are performed substantially simultaneously. Stemmle does indicate that the digitized information may be temporarily stored. Stemmle does not indicate, however, how, where, or for how long, the digitized information may be stored. Further, Stemmle does not indicate that the stored, digitized information may be processed before it is printed.

SUMMARY OF THE INVENTION

It would be advantageous, in a copying apparatus, to store the digitized information after a scanning sweep and to print the stored information during the next successive sweep. If a band memory buffer is employed to store the digitized information, the stored information may be processed electronically before it is printed. By processing,, the stored electronic image may be enhanced. Therefore, superior copy quality may be achieved. Moreover, the incremental cost of adding a band memory buffer to the copy machine does not significantly add to the cost of the apparatus.

It is therefore an object of the present invention to provide a scanning and printing apparatus where each successive band of digitized information is stored in a band memory buffer before being printed.

It is a further object of the present invention to provide a method and apparatus for scanning a document to be copied either bidirectionally or unidirectionally.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

To achieve the above and other objects in accordance with the purposes of the present invention, as embodied and described herein, a method for making on a copy sheet a right reading copy of information on a document in a system having a carriage including an image reading unit co-mounted on the carriage with an image printing unit, comprises the steps of moving the carriage in a first direction with respect to the document and reading a first portion of the document with the image reading unit, digitizing the information read from the first portion of the document to form first digitized information, storing the first digitized information in a memory, moving the carriage in a second direction with respect to the document, and accessing the first digitized information from the memory and printing the first digitized information as a first portion of the copy sheet as the carriage is moved in the second direction. In a further aspect of the present invention, an imaging system comprises means for holding a document having an image thereon, means for holding a copy sheet, image reading means for reading the document and for producing digitized image information representing the image on the document, memory means coupled to said image reading means for storing the digitized image information, printing means coupled to the memory means for accessing the digitized image information and for printing an image corresponding to the digitized image information on a copy sheet, means for causing relative movement of the image reading means and the printing means in a first direction and a second direction with respect to the document and the copy sheet, and means for controlling the image reading means land the memory means to produce and store digitized image information corresponding to a first portion of the document during the relative movement in the first direction and for controlling the printing means to print on a first portion of the copy sheet an image corresponding to digitized image information of said first portion of the document during the relative movement in the second direction.

BRIEF DESCRIPTIONS OF THE DRAWINGS

The accompanying drawings, which are incorporated in and constitute a part of this specification illustrate embodiments of the invention and, together with the description, serve to explain the objects, advantages and principles of the invention. In the drawings.

DESCRIPTION OF THE PREFERRED EMBODIMENTS

Figure 1:
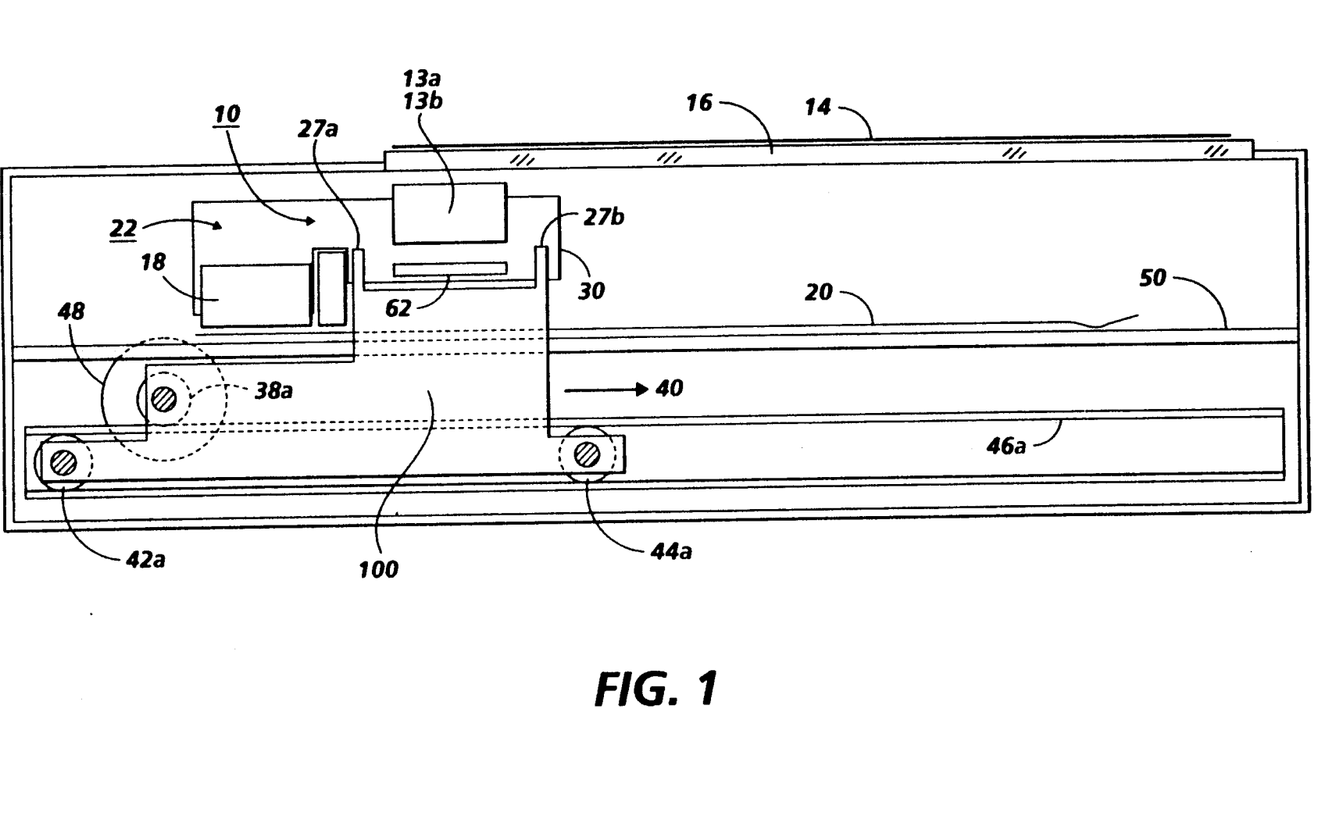
FIG. 1 is a side view of the combined input and output scanner of the present invention.
Figure 2:
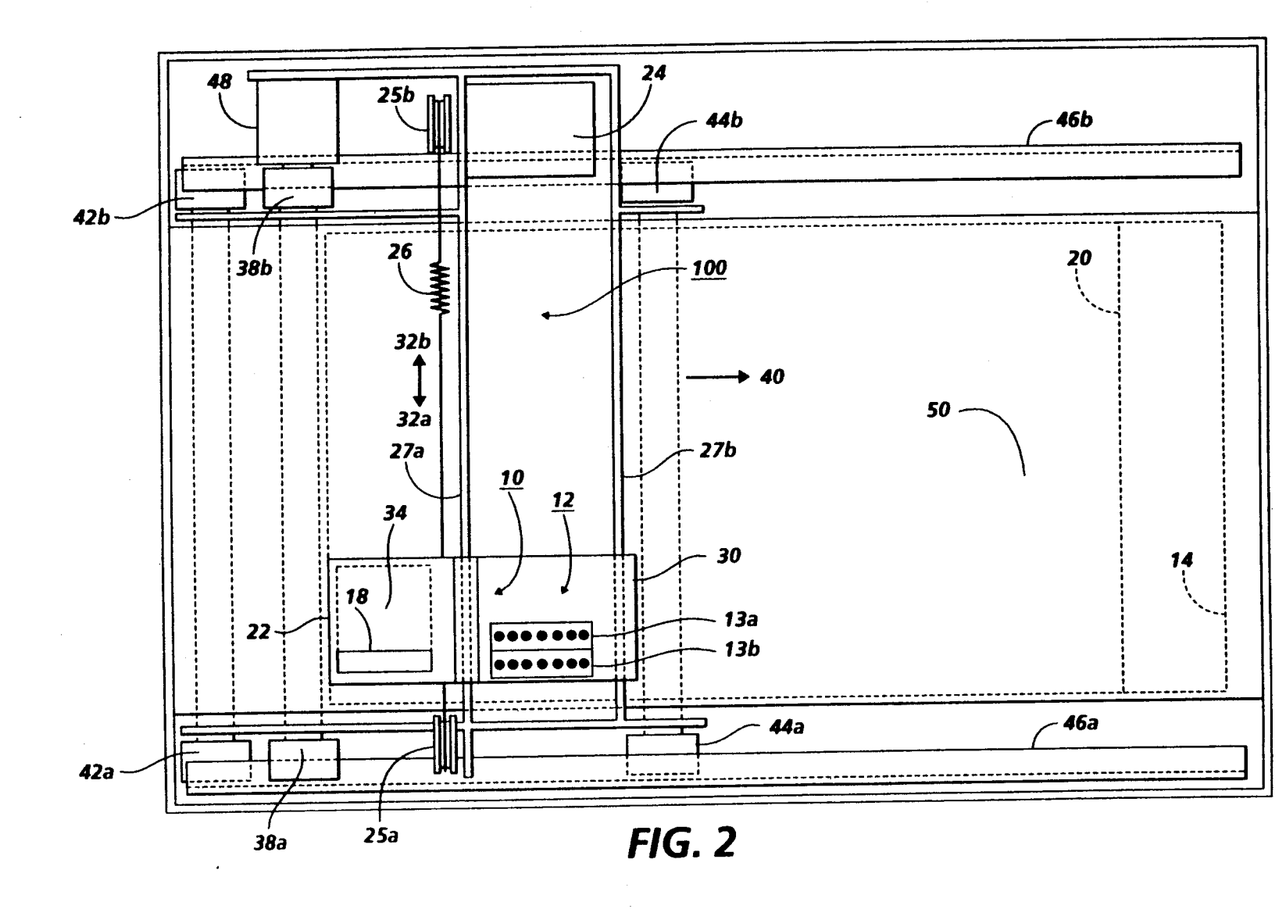
FIG. 2 is a plan view of the scanner shown in FIG. 1.

Referring to FIGS. 1 and 2 of the drawings, there is shown a combined input scanner and output scanner, designated generally by the numeral 10. For input scanning, an image read assembly 12 is composed of an illuminator 13a, which may be an array of light emitting diodes (LEDS) or any other suitable illuminator such as al monolithic semiconductive device that emits light in a similarly controlled way, a lens 13b which may be a SELFOC® lens, and input digitizing chip 62, which may include a substantially monolithic semiconductive device, sometimes called a charge coupled device (CCD) array, or any other suitable device for receiving optical signals and converting them into electronic pixel information in a data register. This assembly scans or reads document originals 14 held or supported on platen 16, where the document image areas scanned being converted to electric image signals or pixels.

Figure 4:
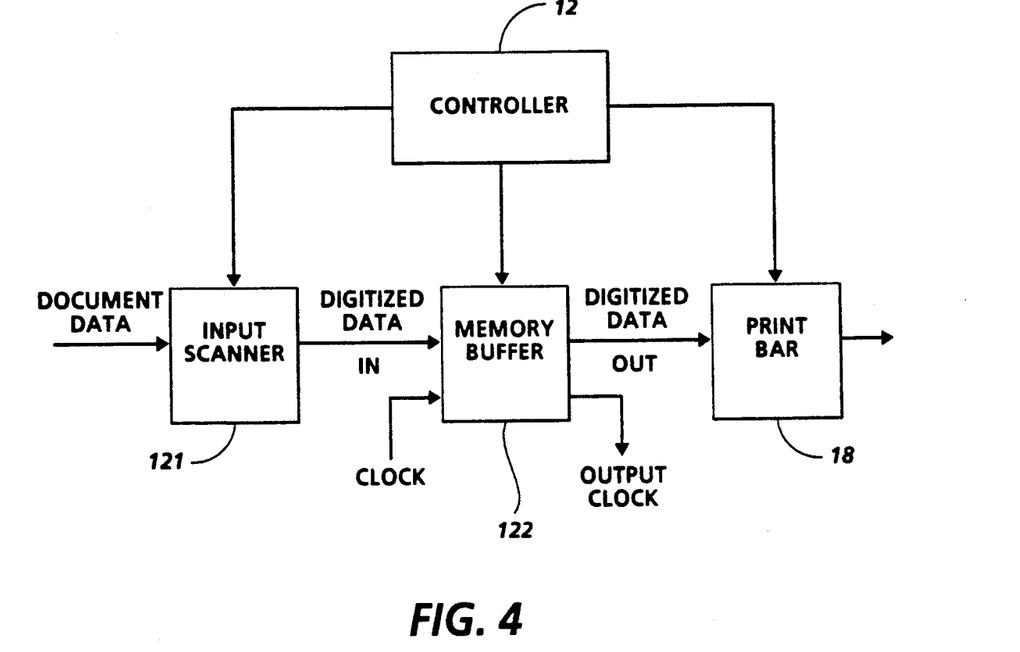
FIG. 4 is a block diagram of the scanning, memory, and printing operations of the present invention.

In accordance with a preferred embodiment of the present invention, the input digitizing chip 62 includes a band memory buffer 122, shown in FIG. 4, which stores the image signals generated by the read head 12 and digitized by the digitizing chip 62. The image signals stored in the band memory buffer 122 are subsequently provided to a print array or print bar 18, which may be any suitable direct imaging device such as a direct thermal or thermal transfer head, or a thermal ink jet array, to write copies of the document originals 14, in accordance with the stored image signals, onto a suitable substrate or copy sheet 20. As will be understood, the number of scanning elements or sensors that comprise image read bar 12 determines the initial scanning resolution, while the number of ink jet nozzles that comprises print array or print bar 18 determines the resolution of the image copy. In a preferred embodiment of the present invention, the number of input scanning elements equals the number of output printing elements.

Figure 3:
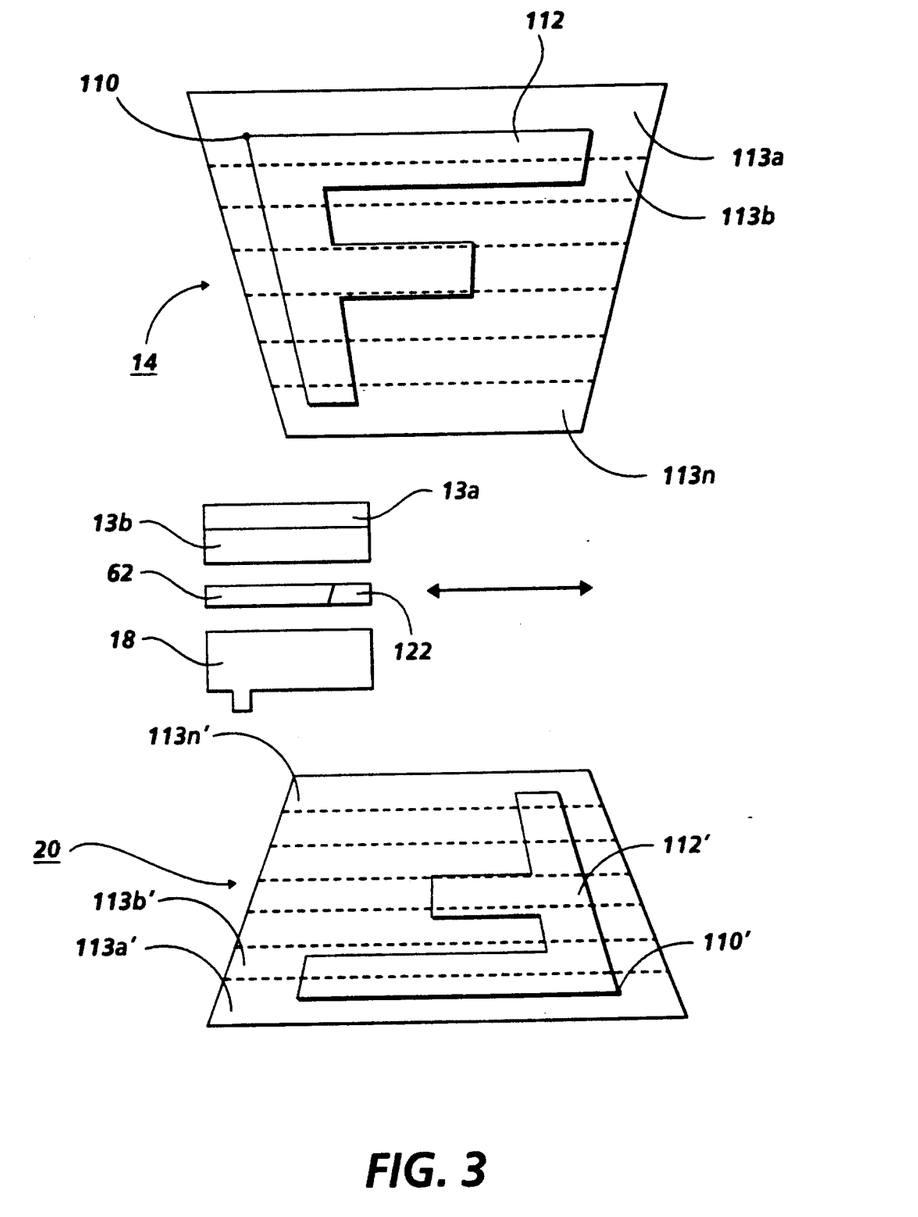
FIG. 3 is a diagram showing the scanning operation of the present invention which produces a right reading image.
Figure 5:
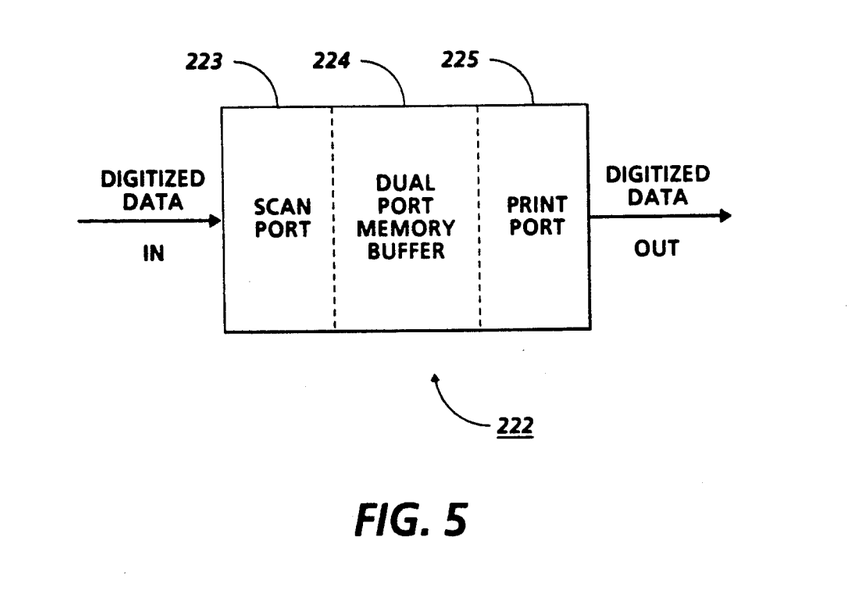
FIG. 5 is a schematic diagram of an alternative memory arrangement for the present invention.

Details of the band memory buffer 122 operation of a preferred embodiment of the present invention are described with respect to FIGS. 3-5.

In accordance with the present invention, both the scanning head and the print head are secured for movement on the same scan carriage generally illustrated at 22. As illustrated in FIG. 2, the input scanning assembly 12, including the LED illumination array 13a, are secured to the carriage 22 for movement underneath the platen 16. Also mounted on the same scanning carriage is the print array or print bar 18 mounted for movement over the copy sheet 20.

The scan carriage 22 is driven by a scan drive motor 24 that is mechanically coupled to the scan carriage 22 via a drive pulley 25b connected to idler pulley 25a by a cable and spring arrangement, illustrated at 26. The arrangement drives the scanning assembly 12 across a document 14 on the platen 16, and at the same time drives the print array or print bar 18 across a copy sheet 20 which is disposed underneath the thermal ink jet array or print bar 18. The scan carriage 22 is suitably secured to the cable and spring arrangement 26 and is mounted to be guided along the scan guide rails 27a and 27b. A slot in the underside of scan carriage 22 accommodates the scan guide rail 27a for support thereof and a flange extension 30 of the scan carriage 22 engages the scan rail 27b for support of the scan carriage.

The scan motor 24, pulleys 25a and 25b, cable and spring arrangement 26, and scan guide rails 27a and 27b are all mounted to index carriage 100 so that scan carriage 22 can be driven back and forth in first and second directions across index carriage 100. In operation, the scan guide motor 24 drives the cable and spring arrangement 26 to pull the scan carriage 22 in a first direction that is shown by the arrow 32a to an end of scan position at one edge of the document 14 and copy sheet 20 wherein the scan drive motor 24 is stopped. The index carriage 100 is then indexed a short distance in the transverse direction, as indicated by arrow 40, and as described below, and then stops. The scan drive motor 24 then drives the scan carriage 22 in the reverse (Second) direction 32b in order to read the next band of information on the document 14 and copy it on the next band of the copy paper 20.

The LED array 13a, lens array 13b, and the image reading array 62 are suitably secured and supported on the top of the scan carriage 22 and the print array or print bar 18 is suitably secured and supported on the underside of the scan carriage 22. A suitable ink supply illustrated at 34 is fastened to the scan carriage 22 near the thermal ink jet array or print bar 18. The index carriage 100 including the scan drive motor 24 and drive system, and scan rails 27a, 27b are suitably mounted on indexing roll pairs 42a, 42b, 44a, and 44b to move the scan carriage 22 in the direction (transverse or third direction) of arrow 40. The indexing roll pairs 42a, 42b, 44a, and 44b extend between the index rails 46a, 46b, where the index rails 46a and 46b are U-shaped channels and stabilize the movement of the indexing assembly in the direction of arrow 40. The movement of the scan carriage 22 in the direction of arrow 40 is guided by the engagement of indexing roll pairs 42a, 42b, 44a, 44b within the channels of index rails 46a and 46b.

An index drive motor 48 is mechanically connected to the drive rolls 38a and 38b, which extend between the index rails 46a and 46b, to index the index carriage 100 supporting the scan carriage 22 in the direction of arrow 40 along the indexing rails. Drive roll 38a is supported on top of index rail 46a and drive roll 38b is supported on top of index rail 46b. The copy paper 201 is disposed upon paper support 50 by any suitable means and held fixed thereto during the copying operation. When index drive motor 48 rotates rolls 38a and 38b, the carriage 100 is moved relative to both the fixed document 14 and the fixed copy paper 20.

FIG. 3 illustrates the scanning operation of a preferred embodiment of the present invention. Particularly, FIG. 3 shows document paper 14 with a document image 112 and copy paper 20 with a copy image 112'. The LED array 13a, the lens array 13b, such as a fiber lens, a strip lens or a SELFOC® lens, and the digitizing chip 62 operate to produce optical signals and to convert the received optical information into electronic pixel information. During a first sweep across document 14, the scanning assembly traverses the width of the document 14 and scans the document 14 in an amount equal to scan width 113a. The electronic pixel information obtained from the first scanning sweep is stored in a band memory buffer 122, which may be integrated into the digitizing chip 62.

The scan width 113a is defined as the width of the band of information to be read from the document 14 and stored in the band memory buffer 122 during each scan of the scanning carriage 24 across the document 14. The scan width 113a can be designed to be any width from a minimum of a single pixel line to a maximum of the width of the entire document 14. In practical terms, in order to keep the cost of the read and write components low, the scan width 113a may be in the area of a fraction of an inch to several inches wide, for example, from about 0.12 inches to about 2.0 inches wide. As shown in FIG. 3, each of the scan widths 113a–113n is the same width for each successive sweep across the document 14. Additionally, the amount of memory space needed for band memory buffer 122 directly corresponds to each of the scan widths 113a–113n, and is therefore the same for each scan.

The scanning operation of the present invention may be performed bidirectionally. During a first sweep across the document 14 in a bidirectional operation, the width 113a of the document 14 is read and digitized. The digitized information from, the digitizing chip 62 is stored in the band memory buffer 122. On the second sweep, in the reverse direction, back across the document 14, the stored digitized information in the band memory buffer 122 from the first sweep is printed on the copy paper 20 by the print array or print bar 18. The printed portion is shown in FIG. 3 as width 113a'. A right reading image 112, is produced on the copy paper 20.

More particularly, to obtain a right reading image, as shown in FIG. 3, point 110 is the first spot of the image 112 of the document 14 which is scanned, while a corresponding point 110, is the first portion of the image 112, on the copy paper 20 which is printed. Accordingly, band 113a, on copy paper 20, corresponding to band 113a of the document 14, is the first band to be printed.

Indexing to the next band of information on the document 14 is performed by index drive motor 48 between scans by the scan drive motor 24. This index movement of the carriage 100 also advances print array or print bar 18 to the next band of the copy paper 20.

During the second sweep of a bidirectional scanning system, the next band of information 113b on the document paper 14 is scanned and digitized. At the same time, the previously stored information of band 113a from the first sweep, which is stored in band memory buffer 122, is printed. Accordingly, the band memory buffer 122 is simultaneously depleted and refilled on all sweeps across the document 14, except for the first sweep and the last sweep. On the first sweep, the band memory buffer 122 is only filled with the information contained in band 113a. On the last sweep, the band memory buffer 122 is only emptied of the information contained in band 113n. By using band buffer memory 122, the stored digitized information may be processed before it is printed during the next successive sweep, as described below.

The above-described bidirectional scanning method is very efficient because the band memory buffer 122 requires only enough memory space to store the information contained in one sweep equal to scan width 113a. Moreover, bidirectional scanning eliminates dead time caused by carriage flyback when unidirectional scanning is employed. However, although bidirectional scanning eliminates the carriage flyback dead time, the mechanical tolerances which are required in order to achieve a copy of acceptable quality are significant.

Therefore, according to another aspect of the present invention, scanning may be performed unidirectionally. In a unidirectional scanning system, during all sweeps but the last sweep in one direction the document 14 is read and digitized. Neither imaging nor printing occurs during all sweeps in the opposite direction. And during all sweeps but the first sweep, the information stored in the band memory buffer 122 is printed. Again, as when bidirectional scanning is performed, the digitized information from digitizing chip 62 is stored in the band memory buffer 122 before it is printed. Accordingly, the stored digitized information in the band memory buffer 122 may be processed before it is printed on the next successive sweep.

A right reading image 112', as shown in FIG. 3, is also achieved with unidirectional scanning by reading and digitizing the document 14 during all sweeps but the last sweep in a first direction, i.e., to the right, and printing on copy 20 the band of information recorded during the previous sweep on all sweeps in the same direction, i.e. to the right, and processing the stored information such that the first spot of document image 112 to be scanned and digitized is point 110, while the last spot of document image 112' to be printed is point 110'. Thus, for a right reading image with unidirectional scanning, the image processing should include printing the last stored pixel information first, and printing the first stored pixel information last.

Again, as with bidirectional scanning, the same capacity of band buffer memory 122 is required to store digitized data presenting each scan width 113a-113n. However, with unidirectional scanning, copying is mechanically easier to achieve. This is because the mechanical tolerances of the scanning apparatus are decreased when scanning occurs in only one direction. Additionally, the carriage design is simpler. However,, with unidirectional scanning, it takes up to twice as long to make a copy as compared with bidirectional scanning.

FIG. 4 shows a block diagram of the operation of the band memory buffer 122 of the present invention. As shown in FIG. 4, an input scanner 121, comprising LED array 13a and lens array 13b and input chip 62 outputs digital data representing the scanned image on the document to the band memory buffer 122. The band memory buffer 122 is used to store the digitized data so that the image ultimately outputted to the copy paper 20 may be digitally enhanced and refined.

For example, the stored digitized data may be modified in order to remove "Jaggies" which give the copy 20 a rough and unfinished look, particularly with respect to diagonal lines. Additionally, band memory buffer 122 may be used to store the digitized data for processing in order to remove spurious characters which would appear on the background of the copy paper 20. Thus, a cleaner background of the copy 20 may be obtained.

Moreover, the stored digitized data may also be processed in order to compensate for repeatable errors which arise as a result of mechanical constraints of the elements of the scanning system. For example, when unidirectional scanning is employed, errors which occur with every scan cycle may be easily compensated for. That is, predictable errors which occur with every scan due to, for example, time delays, may be compensated for because practically the same error occurs with each scan sweep. Accordingly, by storing the digitized information in the band memory buffer 122, the digitized data may be processed in order to; compensate for these predictable errors. Repeatable errors which occur as a result of bidirectional scanning may also be compensated for by processing the digitized data when it is stored in band memory buffer 122.

The digitized data stored in band memory buffer 122 is processed, as described above, and sent to be printed by print bar 18, as described with respect to FIG. 3.

The operations of input scanner 121, band memory buffer, and print bar 18 are controlled by a controller 123. Controller 123 sends a control signal to input scanner 121 which causes the scanning to be performed by the input scanner 121. As explained above the scanning may be performed either bidirectionally or unidirectionally.

Controller 123 also controls the storing of the digitized data in band memory buffer 122 by sending a store signal to band memory buffer 122 while scanning by input scanner 121 is performed. Controller 123 additionally controls the release of the digitized data from band memory buffer 122 to print bar 18 when printing is desired.

Band memory buffer 122 of the present invention may advantageously comprise a FIFO, first in first out, memory or a LIFO, last in first out memory. However, the memory may also comprise a dual port structure 222 as shown in FIG. 5. FIG. 5 shows dual port memory buffer 224 that includes a scan port 223 that receives digitized data and a print port 225 that outputs the.; digitized data after it has been stored and processed.

Other embodiments of the invention will be apparent to those skilled in the art from consideration of the specification and practice of the invention disclosed herein. It is intended that the specification and examples be considered as exemplary only, with the true scope and spirit of the invention being indicated by, the following claims.

What is claimed is:

1. A method for making on a copy sheet a right reading copy of information on a document in a system having a carriage including an image reading unit co-mounted on the carriage with an image printing unit, comprising the steps of:

moving the carriage in a first direction with respect to the document and reading a first portion of the document with the image reading unit;

digitizing the information read from the first portion of the document to form first digitized information;

storing the first digitized information in a memory for a period of time when the carriage is moved in the first direction;

moving the carriage in a second direction with respect to the document; and accessing the first digitized information from the memory and printing the first digitized information as a first portion of the copy sheet when the carriage is moved inn the second direction.

2. The method of claim 1, wherein the second direction is opposite to the first direction.

3. The method of claim 1, wherein the second direction is the same as the first direction.

4. The method of claim 1, further including the steps of:

reading information contained in a second portion of the document while the carriage is moved in the second direction and the first digitized information is printed on the first portion of the copy sheet;

digitizing the information read from the second portion of the document to form second digitized information; and storing the second digitized information in the memory.

5. The method of claim 4, further including the steps of:

moving the carriage in the first direction and reading information contained in a third portion of the document while the carriage is moved in the first direction;

digitizing the information read from the third portion of the document to form third digitized information;

storing the third digitized information in the memory;

accessing the second digitized information from the memory and printing the second digitized information on a second portion of the copy sheet as the carriage is moved in the first direction.

6. The method of claim 1, further including the steps of holding the document and the copy sheet in fixed positions during movement of the carriage.

7. The method of claim 1, further including the step of indexing the carriage with respect to the document and the copy sheet in a direction orthogonal to the first direction.

8. The method of claim 3, wherein each of said first and second portions of the document corresponds to a band having a length between 0.12 and 2.0 inches measured in a direction orthogonal to the first and second directions.

9. The method of claim 1, wherein the accessing step includes accessing the first digitized information in a sequence in which it was stored.

10. The method of claim 1, wherein the accessing step includes accessing the first digitized information in a sequence revered from a sequence in which it was originally stored in the memory.

11. A method for making on a copy sheet, having N portions, a right reading copy of information on a document having N portions in a system having a carriage including an image reading unit co-mounted on the carriage with an image printing unit, comprising the steps of:
 moving the carriage in a first direction with respect to the document and reading portion of the document with the image reading unit, where n is an integer from 1 to N;
 digitizing the information read from portion n of the document to form n portion of digitized information;
 storing the n portion of digitized information in a memory for a period of time when the carriage is moved in the first direction;
 moving the carriage in a second direction with respect to the document and reading portion n+1 of the document with the image reading unit;
 digitizing the information read from portion n+1 of the document to form n+1 portion of digitized information;
 storing the n+1 portion of digitized information in the memory for a period of time when the carriage is moved in the second direction; and
 accessing the n portion of digitized information from the memory and printing the n portion of digitized information on portion n of the copy sheet when the carriage is moved in the second direction.

12. The method of claim 11, wherein the second direction is opposite to the first direction.

13. The method of claim 11, wherein the second direction is the same as the first direction.

14. The method of claim 11, including performing all of the aforesaid steps, N times, until all N portions of the document are copied onto the copy paper in N portions.

15. The method of claim 11, including performing all of the aforesaid steps N—1 times, and including a precedent sequence comprising only reading a top or bottom portion of the document, and comprising the aforesaid second step of digitizing the read information and storing such information, and including a final sequence following the N—1 performances comprising only accessing the last stored portion of digitized information and printing the digitized information so accessed on a corresponding bottom or top portion of the copy sheet.

16. An imaging system comprising:
 means for holding a document having an image thereon;
 means for holding a copy sheet;
 image reading means for reading the document and for producing digitized image information representing the image on the document;
 memory means coupled to said image reading means for storing said digitized image information;
 printing means coupled to said memory means for accessing said digitized image information and for printing an image corresponding to said digitized image information on a copy sheet;
 means for causing relative movement of said image reading means and said printing means in a first direction and a second direction with respect to the document and the copy sheet; and
 means for controlling said image reading means and said memory means to produce and store digitized image information corresponding to a first portion of the document during said relative movement in said first direction, said relative movement in said first direction being substantially equal to one scanning sweep and for controlling said printing means to print on a first portion of the copy sheet an image corresponding to digitized image information of said first portion of the document during said relative movement in said second direction, said relative movement in said second direction being substantially equal to one scanning sweep.

17. The imaging system according to claim 16, wherein the first direction is opposite to said second direction.

18. The imaging system according to claim 17, wherein said first direction is the same as said second direction.

19. The imaging system according to claim 16, wherein said controlling means controls said image reading means and said memory means to produce and store digitized image information corresponding to a second portion of the document during said relative movement in said second direction as said printing means prints in said first portion of the copy sheet.

20. The imaging system according to claim 16, wherein said printing means comprises one of a means for direct thermal printing, means for thermal transfer printing, and a thermal ink jet array.

21. The imaging system according to claim 16, wherein said memory means and printing means together comprise a first-input-first-output memory access arrangement.

22. The imaging system according to claim 16, wherein said memory means comprises a dual port memory buffer with a scan port and a print port.

23. The imaging system according to claim 16, wherein said image reading means comprises:
 means for illuminating the document;
 lens means for focusing the illuminated portion of the document; and
 digitizing means, coupled to the lens means, for receiving the focused optical signals and for converting them into electronic pixel information.

24. The imaging system according to claim 23 wherein said digitizing means includes a substantially monolithic semiconductive device.

25. The imaging system according to claim 23, wherein said means for illuminating the document is an array of light emitting semiconductive devices.

26. The imaging system according to claim 16, further comprising:

means for causing indexing of said image reading means in a third direction transverse to said first and second directions so that subsequent portions of said document may be read.

27. The imaging system according to claim 16, wherein said image reading means and said printing means are rigidly secured for relative movement with respect to said copy sheet in said first and second directions.

28. The imaging system according to claim 27, wherein said image reading means and said printing means are rigidly secured for relative movement with respect to said copy sheet in a direction orthogonal to said first and second directions.

29. The method of claim 11 wherein the moving step comprises moving the carriage by such amounts that the n and n+1 portions of the document are related and the accessing step comprises accessing the n and n+1 digitized information from the memory in a corresponding relation to print information on the copy paper that is right reading and continuous from band to band.

30. The imaging system of claim 16, wherein the means for controlling the image reading means and the memory means and for controlling the printing means comprises means for providing a relationship of the printed information on the copy paper that is right reading and continuous from band to band.

31. The imaging system of claim 16, wherein said memory means and printing means together comprise a last-input-first-output memory access arrangement.

32. The imaging system according to claim 23, wherein the means for illuminating the document is a substantially monolithic 11 semiconductive device.

* * * * *